J. EDGAR.
Fire-Shovels.

No. 156,552.

Patented Nov. 3, 1874.

Witnesses:
Chas Wahlers
Henry Gentner

Inventor:
James Edgar
by VanSantvoord & Hauff
his Attys

UNITED STATES PATENT OFFICE.

JAMES EDGAR, OF NEW YORK, N. Y.

IMPROVEMENT IN FIRE-SHOVELS.

Specification forming part of Letters Patent No. 156,552, dated November 3, 1874; application filed July 22, 1874.

*To all whom it may concern:*

Figure 1:
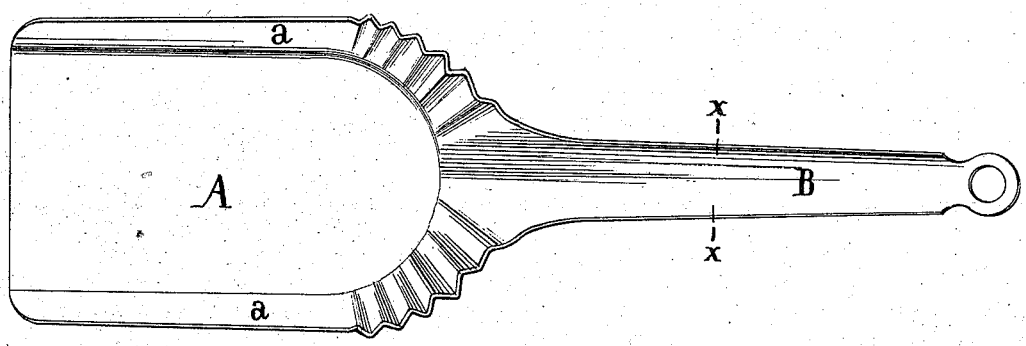
Figure 3:
Figure 2:
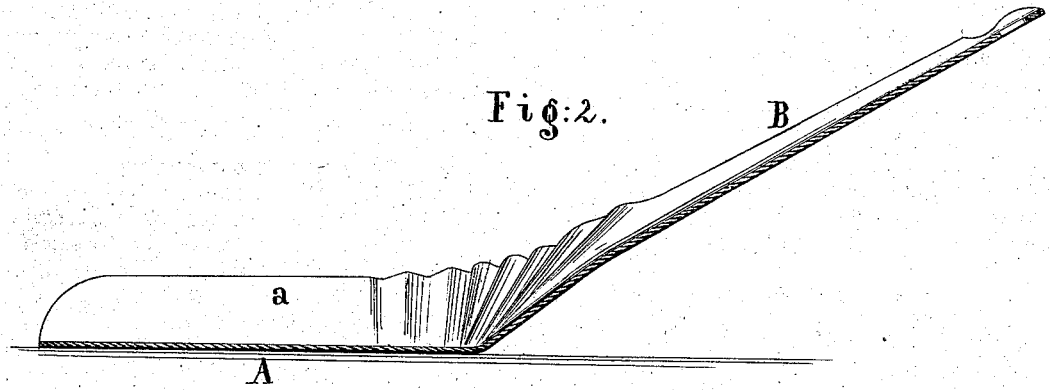

Be it known that I, JAMES EDGAR, of the city, county, and State of New York, have invented certain new and useful Improvements in Coal-Shovels, of which the following is a specification:

This invention is illustrated in the accompanying drawing, in which Figure 1 represents a longitudinal section of my shovel. Fig. 2 is a plan or top view of the same.

Similar letters indicate corresponding parts.

This invention consists in a coal-shovel, which is stamped up, together with its handle, out of one solid piece of sheet metal, the rim of the shovel being partly corrugated, so as to increase its strength, and the handle being V-shaped in its cross-section, whereby the same obtains the requisite stiffness and rigidity.

In the drawing, the letter A designates a shovel, which, together with its handle B, is stamped up out of a solid piece of sheet metal, the pattern being such that in cutting out the blanks very little, if any, material is wasted.

The shovel A is provided with a rim, *a*, and that portion of this rim which approaches the handle B is corrugated so as to increase its strength, and to impart to the shovel the requisite durability and power of resistance.

The handle B is made V-shaped in its cross-section, its central portion being either depressed, as shown, or, if desired, said central portion may be raised, and the edges depressed. By stamping up the handle in this shape its strength is increased, and the required stiffness is imparted to it without increasing its bulk.

By these means I am enabled to produce a strong and durable shovel at a very low price.

What I claim as new, and desire to secure by Letters Patent, is—

As a new article of manufacture, a sheet-metal shovel, the body, handle, and rim of which are made in one piece, that portion of the rim which approaches the handle being corrugated, and the whole constructed substantially as herein shown and described.

In testimony that I claim the foregoing I have hereunto set my hand and seal.

JAMES EDGAR. [L. S.]

Witnesses:
CHAS. WAHLERS,
E. F. KASTENHUBER.